(12) United States Patent
Eguchi et al.

(10) Patent No.: US 12,084,304 B2
(45) Date of Patent: Sep. 10, 2024

(54) MEDIUM-FEEDING APPARATUS, IMAGE READING APPARATUS, AND MEDIUM-FEEDING METHOD

(71) Applicant: SEIKO EPSON CORPORATION, Tokyo (JP)

(72) Inventors: Seiji Eguchi, Kitakyushu (JP); Takayuki Shiota, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 260 days.

(21) Appl. No.: 17/457,784

(22) Filed: Dec. 6, 2021

(65) Prior Publication Data

US 2022/0177244 A1 Jun. 9, 2022

(30) Foreign Application Priority Data

Dec. 7, 2020 (JP) ................. 2020-202678

(51) Int. Cl.
*B65H 7/08* (2006.01)
*B65H 7/06* (2006.01)
*B65H 7/20* (2006.01)
*H04N 1/00* (2006.01)

(52) U.S. Cl.
CPC .......... *B65H 7/08* (2013.01); *H04N 1/00602* (2013.01); *H04N 1/00705* (2013.01); *H04N 1/00745* (2013.01); *H04N 1/00774* (2013.01); *H04N 1/00795* (2013.01); *B65H 2511/24* (2013.01)

(58) Field of Classification Search
CPC ... B65H 7/08; B65H 7/06; B65H 7/20; B65H 7/18; B65H 2511/24; B65H 2511/528; B65H 2511/521; B65H 2513/41; B65H 2513/512; H04N 1/00602; H04N 1/00705; H04N 1/00745; H04N 1/00774; H04N 1/00795; H04N 1/00777
See application file for complete search history.

(56) References Cited

U.S. PATENT DOCUMENTS

| | | |
|---|---|---|
| 2006/0159471 A1 | 7/2006 | Yasukawa et al. |
| 2012/0235929 A1 | 9/2012 | Hongo et al. |
| 2019/0100396 A1 | 4/2019 | Shiota et al. |

(Continued)

FOREIGN PATENT DOCUMENTS

| | | |
|---|---|---|
| JP | S57-169767 A | 10/1982 |
| JP | 2001-302021 A | 10/2001 |

(Continued)

*Primary Examiner* — Luis A Gonzalez
(74) *Attorney, Agent, or Firm* — WORKMAN NYDEGGER

(57) ABSTRACT

A medium-feeding apparatus includes a movement detector configured to output information on movement of a medium in a first direction parallel to a feeding direction and in a second direction intersecting the feeding direction. A control unit is configured to perform abnormal feeding processing depending on the movement of the medium in the second direction. In the abnormal feeding processing, the control unit stops feeding of the medium when a first value indicating the movement of the medium in the first direction is within an allowable range and when a second value indicating the movement of the medium in the second direction exceeds a threshold, and continues feeding of the medium when the first value is outside the allowable range.

8 Claims, 10 Drawing Sheets

(56) References Cited

U.S. PATENT DOCUMENTS

2020/0171856 A1 6/2020 Shiota et al.
2020/0177751 A1* 6/2020 Shiota ................ H04N 1/00713

FOREIGN PATENT DOCUMENTS

| JP | 2006-193286 A | | 7/2006 |
|---|---|---|---|
| JP | 2012-193040 A | | 10/2012 |
| JP | 2017061375 A | * | 3/2017 |
| JP | 2019-064790 A | | 4/2019 |
| JP | 2020-033144 A | | 3/2020 |
| JP | 2020-083620 A | | 6/2020 |
| JP | 2021-083051 A | | 5/2021 |

* cited by examiner

MEDIUM-FEEDING APPARATUS, IMAGE READING APPARATUS, AND MEDIUM-FEEDING METHOD

The present application is based on, and claims priority from JP Application Serial Number 2020-202678, filed Dec. 7, 2020, the disclosure of which is hereby incorporated by reference herein in its entirety.

BACKGROUND

1. Technical Field

The present disclosure relates to a medium-feeding apparatus for feeding a medium and to an image reading apparatus having the medium-feeding apparatus. The present disclosure also relates to a medium-feeding method in the medium-feeding apparatus.

2. Related Art

Image reading apparatuses and recording apparatuses are provided with a medium-feeding apparatus for feeding a medium. During feeding of a medium, abnormal feeding may occur, and techniques for detecting such abnormal feeding are known. JP-A-2019-64790 discloses a medium-feeding apparatus including a medium movement detection unit that detects movement in a width direction intersecting a medium-feeding direction and that is disposed upstream of a feeding roller. The medium-feeding apparatus stops a job when a physical quantity relating to movement of a medium in the width direction exceeds a predetermined threshold. The medium-feeding apparatus described in JP-A-2019-64790 detects abnormal feeding caused by, in particular, feeding of stapled sheets of the medium.

The movement of a medium in the width direction is detected when abnormal feeding occurs and may also be detected in an event of temporary fluctuation in operation of feeding a medium having wrinkles, even though the feeding is normal. Accordingly, abnormal feeding that is detected in accordance with only movement of a medium in the width direction may result in an erroneous determination. Such an erroneous determination may stop the feeding of the medium even though the feeding of the medium can be continued.

SUMMARY

According to an aspect of the present disclosure for solving the above-described problem, a medium-feeding apparatus includes a medium mounting section on which a medium is to be mounted, a feeding roller configured to feed the medium mounted on the medium mounting section in a feeding direction, a movement detector disposed upstream of the feeding roller in the feeding direction, the movement detector being configured to output information on movement of the medium in a first direction parallel to the feeding direction and in a second direction intersecting the feeding direction, and a control unit configured to control feeding of the medium in accordance with the information acquired from the movement detector. The control unit is configured to perform abnormal feeding processing depending on the movement of the medium in the second direction, and in the abnormal feeding processing, the control unit stops feeding of the medium when a first value indicating the movement of the medium in the first direction is within an allowable range and a second value indicating the movement of the medium in the second direction exceeds a threshold, and the control unit continues feeding of the medium when the first value is outside the allowable range.

According to another aspect of the present disclosure, a medium-feeding method for a medium-feeding apparatus including a medium mounting section on which a medium is to be mounted, a feeding roller configured to feed the medium mounted on the medium mounting section in a feeding direction, and a movement detector disposed upstream of the feeding roller in the feeding direction, the movement detector being configured to output information on movement of the medium in a first direction parallel to the feeding direction and in a second direction intersecting the feeding direction is provided. The medium-feeding method includes stopping feeding of the medium when a first value indicating the movement of the medium in the first direction is within an allowable range and a second value indicating the movement of the medium in the second direction exceeds a threshold, and continuing feeding of the medium when the first value is outside the allowable range.

DESCRIPTION OF EXEMPLARY EMBODIMENTS

Figure 1:
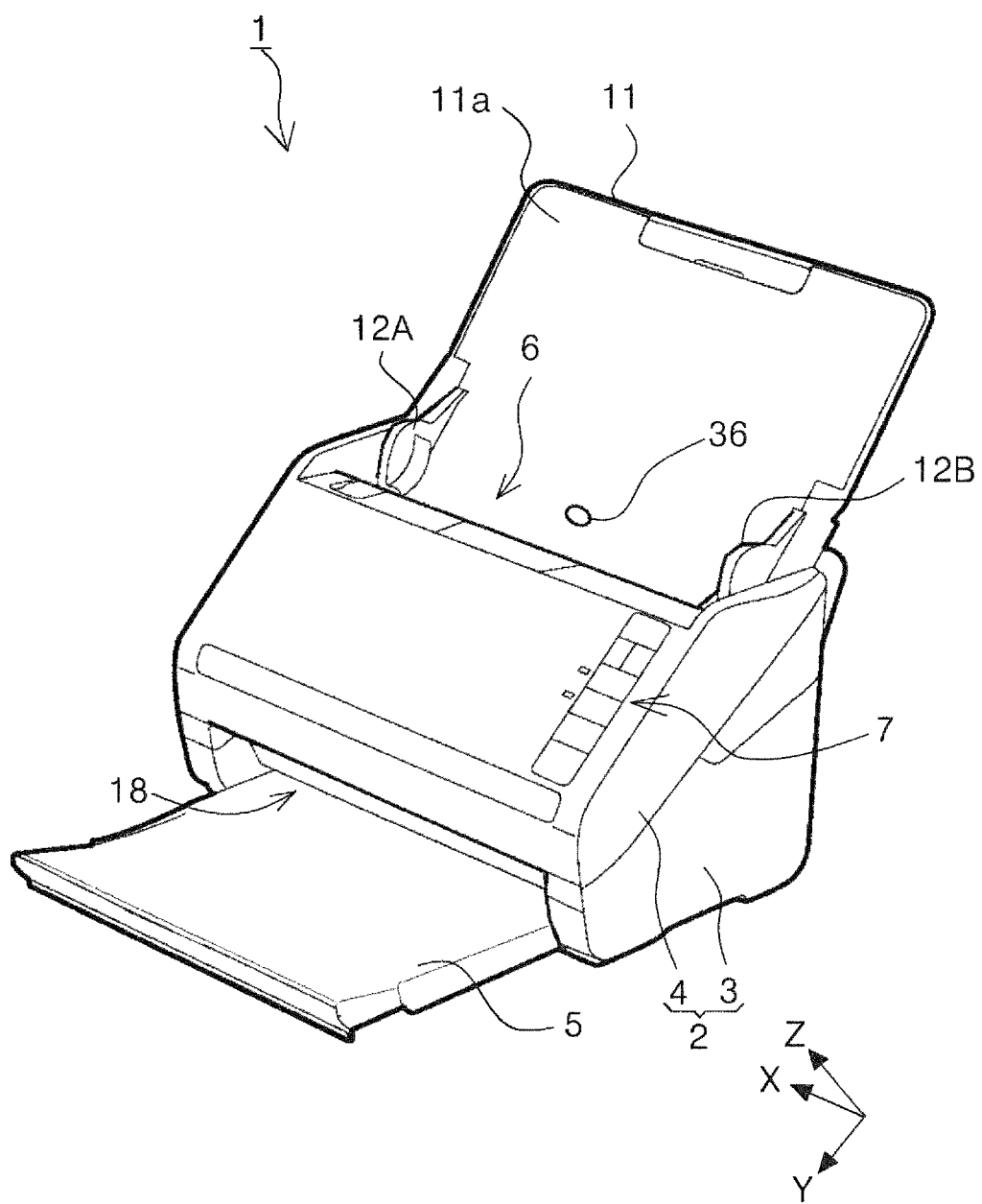
FIG. 1 is an external perspective view of a scanner.

Hereinafter, an overview of the present disclosure will be described. A medium-feeding apparatus according to a first aspect includes a medium mounting section on which a medium is to be mounted, a feeding roller configured to feed the medium mounted on the medium mounting section in a feeding direction, a movement detector disposed upstream of the feeding roller in the feeding direction, the movement detector being configured to output information on movement of the medium in a first direction parallel to the feeding direction and in a second direction intersecting the feeding direction, and a control unit configured to control feeding of the medium in accordance with the information acquired from the movement detector. The control unit is configured to perform abnormal feeding processing depending on the movement of the medium in the second direction, and in the abnormal feeding processing, the control unit stops feeding of the medium when a first value indicating the movement of the medium in the first direction is within an allowable range and a second value indicating the movement of the medium in the second direction exceeds a threshold, and the control unit continues feeding of the medium when the first value is outside the allowable range.

In performing the abnormal feeding processing depending on the movement of the medium in the second direction, temporary medium transport fluctuations that may cause erroneous abnormal feeding detection may cause transport fluctuations in the first direction. In this aspect, by using such characteristics, when the first value indicating the movement of the medium in the first direction is outside the allowable range, the feeding of the medium is continued regardless of the acquired second value indicating the movement of the medium in the second direction or without acquiring the second value, thereby suppressing erroneous detection of abnormal feeding due to temporary transport fluctuations.

According to a second aspect, the medium-feeding apparatus of the first aspect may further include a transport roller pair disposed downstream of the feeding roller in the feeding direction, the transport roller pair being configured to transport the medium downstream. The control unit performs the abnormal feeding processing in a first period from passage of a leading edge of the medium past the feeding roller to arrival of the leading edge at the transport roller pair, and the control unit does not perform the abnormal feeding processing in a period, other than the first period, from the start of feeding of the medium to the arrival of the leading edge at the transport roller.

When the leading edge of the document passes the feeding roller, temporary transport fluctuations tend to occur. In view of such characteristics, the control unit according to the second aspect performs the abnormal feeding processing in a first period from passage of a leading edge of the medium past the feeding roller to arrival of the leading edge at the transport roller pair, and does not perform the abnormal feeding processing in a period, other than the first period, from the start of feeding of the medium to the arrival of the leading edge at the transport roller. Accordingly, erroneous detection of abnormal feeding due to temporary transport fluctuations can be suppressed.

According to a third aspect, the medium-feeding apparatus according to the second aspect may further include a first detector disposed downstream of the feeding roller in the feeding direction, the first detector being configured to detect the passage of the leading edge of the medium. The control unit may set the first period to a period from the passage of the leading edge of the medium detected by using the first detector to a time the document is transported by a predetermined amount. According to the third aspect, the control unit may set the first period to a period from the passage of the leading edge of the medium detected by using the first detector to a time the document is transported by a predetermined amount, and thus the end of the first period is readily set without using a component such as a sensor.

According to a fourth aspect, the medium-feeding apparatus according to the second aspect may further include a first detector disposed downstream of the feeding roller in the feeding direction, the first detector being configured to detect the passage of the leading edge of the medium, and a second detector disposed downstream of the first detector in the feeding direction, the second detector being configured to detect the passage of the leading edge of the media. The control unit may set the first period to a period from the passage of the leading edge of the medium detected by using the first detector to the passage of the leading edge of the medium detected by using the second detector. According to the fourth aspect, the start of the first period is set by using the first detector and the end of the first period is set by using the second detector, thereby the start of the first period and the end of the first period can be set accurately.

According to a fifth aspect, the control unit according to any one of the first to fourth aspects may perform the abnormal feeding processing when a medium-feeding velocity is constant. According the fifth aspect, in the configuration in which the control unit performs the abnormal feeding processing when a medium-feeding velocity is constant, the effects and advantages according to any one of the above-described first to fourth aspects can be achieved. In this specification, the phrase "a medium-feeding velocity is constant" means that the control unit regulates the rotation of motors such that the medium-feeding velocity is to be constant at a target velocity not as acceleration control nor deceleration control.

According to a sixth aspect, in the medium-feeding apparatus according to any one of first to fifth aspects, the allowable range may be a range from an upper limit obtained by adding a percentage of a target medium-feeding velocity to the target medium-feeding velocity to a lower limit obtained by subtracting the percentage from the target medium-feeding velocity or is a range from an upper limit obtained by multiplying the target medium-feeding velocity by a factor greater than or equal to one and a lower limit obtained by multiplying the target medium-feeding velocity by a factor less than one.

According to the sixth aspect, the allowable range is a range from an upper limit obtained by adding a percentage of a target medium-feeding velocity to the target medium-feeding velocity to a lower limit obtained by subtracting the percentage from the target medium-feeding velocity, or a range from an upper limit obtained by multiplying the target medium-feeding velocity by a factor greater than or equal to one and a lower limit obtained by multiplying the target medium-feeding velocity by a factor less than one. Accordingly, the allowable range may be appropriately set depending on a target medium-feeding velocity.

According to a seventh aspect, in the medium-feeding apparatus according to any one of the first to sixth aspects, the feeding roller may come into contact with a bottom surface of the medium mounted on the medium mounting section, and the movement detector may be disposed at a position facing the bottom surface of the medium mounted on the medium mounting section. According to the seventh aspect, when sheets of the medium are mounted on the medium mounting section, the feeding roller comes into contact with the lowermost medium of the sheets of the medium mounted on the medium mounting section, and the movement detector is disposed at a position facing the lowermost medium of the sheets of the medium mounted on the medium mounting section, thereby the effects and advantages according to any one of the first to sixth aspects can be achieved.

According to an eighth aspect, an image reading apparatus includes a reader configured to read the medium, and the medium-feeding apparatus configured to feed the medium to the reader according to any one of first to seventh aspects. According to the eighth aspect, in the image reading apparatus, the effects and advantages according to any one of the first to eighth aspects can be achieved.

A medium-feeding method according to a ninth aspect for a medium-feeding apparatus including a medium mounting section on which a medium is to be mounted, a feeding roller configured to feed the medium mounted on the medium mounting section in a feeding direction, and a movement detector disposed upstream of the feeding roller in the feeding direction, the movement detector being configured to output information on movement of the medium in a first direction parallel to the feeding direction and in a second direction intersecting the feeding direction is provided. The medium-feeding method includes stopping feeding of the medium when a first value indicating the movement of the medium in the first direction is within an allowable range and a second value indicating the movement of the medium in the second direction exceeds a threshold and includes continuing feeding of the medium when the first value is outside the allowable range.

In performing the abnormal feeding processing depending on the movement of the medium in the second direction, temporary medium transport fluctuations that may cause erroneous abnormal feeding detection may cause transport fluctuations in the first direction. In this aspect, by using such characteristics, when the first value indicating the movement of the medium in the first direction is outside the allowable range, the feeding of the medium is continued regardless of the acquired second value indicating the movement of the medium in the second direction or without acquiring the second value, thereby suppressing erroneous detection of abnormal feeding due to temporary transport fluctuations.

Hereinafter, an embodiment of the present disclosure will be described. In the description below, a sheet-fed scanner (hereinafter, simply referred to as a scanner) that is capable of reading at least one of a front side and a back side of a document, which is an example medium, will be described as an example image reading apparatus. In the following description, a document is referred to as a document P.

The X-Y-Z coordinate system in the drawings is an orthogonal coordinate system, in which the X-axis direction denotes an apparatus width direction and denotes a document width direction that intersects a document transport direction, the Y-axis direction is parallel to the document transport direction and forms an inclined angle with respect to horizontal in this embodiment, and the Z-axis direction is orthogonal to the Y-axis direction and approximately orthogonal to a surface of a document being transported. A positive Y direction corresponds to downstream of the feeding direction and the transport direction of the document P, and a negative Y direction corresponds to upstream of the feeding direction and the transport direction of the document P.

FIG. 1 is an external perspective view illustrating a scanner 1. The scanner 1 has an apparatus body 2 that includes therein a reading section 20 (see FIG. 2) for reading an image of a document P. The apparatus body 2 includes a lower unit 3 and an upper unit 4. The upper unit 4 is openable and closable with respect to the lower unit 3 by being rotated about a rotation shaft (not illustrated) disposed in the positive Y direction. The user can open the upper unit 4 in the apparatus front direction to expose the inside of the apparatus to clear a jammed document P.

A document mounting section 11 having a mounting surface 11a on which documents P to be fed are mounted is provided on the rear of the apparatus body 2. The document mounting section 11 is provided with a pair of edge guides for guiding side edges of mounted documents P in the width direction; more specifically, the document mounting section 11 is provided with edge guides 12A and 12B. The edge guides 12A and 12B are movable in the X-axis direction.

The apparatus body 2 has an operation panel 7 on the apparatus front of the upper unit 4. The operation panel 7 is used to set various settings for reading, to execute a reading operation, or the like. A feed port 6 that extends inside of the apparatus body 2 is defined in an upper portion of the upper unit 4. Documents P mounted on the document mounting section 11 are fed toward the reading section 20 by a document feeder 10, which will be described below. Documents P that have been read are discharged from a discharge port 18 defined on the front of the lower unit 3 toward a discharge tray 5.

Figure 2:
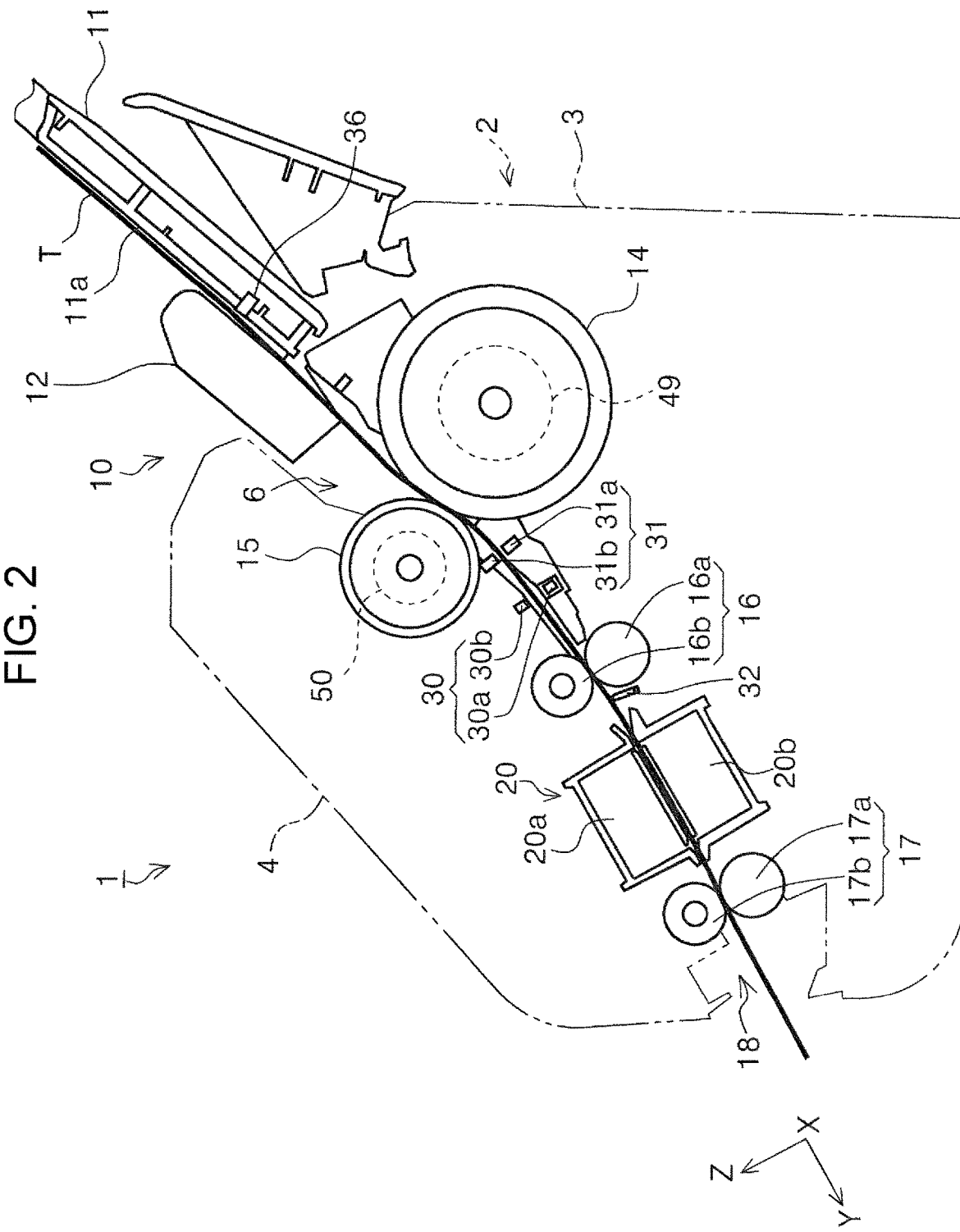
FIG. 2 is a side cross-sectional view of a document transport path in a scanner.

A document feeding path in the scanner 1 will be described with reference to FIG. 2 and FIG. 3. The scanner 1 includes the document feeder 10. The document feeder 10 includes the document mounting section 11, a feeding roller 14, a separation roller 15, a controller 40 (see FIG. 4), and a two-dimensional sensor 36. On the document mounting section 11, documents P are to be mounted. The feeding roller 14 feeds documents P mounted on the document mounting section 11. The separation roller 15 separates documents P. The controller 40 is an example control unit. The two-dimensional sensor 36 is an example movement detector. The document feeder 10 may serve as an apparatus that has the functions of the scanner 1 except the document reading function, specifically, the reading section 20, which will be described below. However, the scanner 1 that has the reading section 20 may be regarded as a document feeder from the viewpoint of document feeding. In FIG. 2, solid line T indicates a document feeding path, that is, a trajectory of a document P.

The document mounting section 11 is disposed furthest upstream of the document feeding path T. The feeding roller 14 for feeding a document P mounted on the mounting surface 11a of the document mounting section 11 toward the reading section 20 and the separation roller 15 for nipping and separating, with the feeding roller 14, the document P are disposed downstream of the document mounting section 11. The feeding roller 14 comes into contact with the lowermost document P of documents P mounted on the mounting surface 11a of the document mounting section 11. Accordingly, when documents P are set on the document mounting section 11 of the scanner 1, the documents P are sequentially fed downstream from the document P on the mounting surface 11a side.

Figure 3:
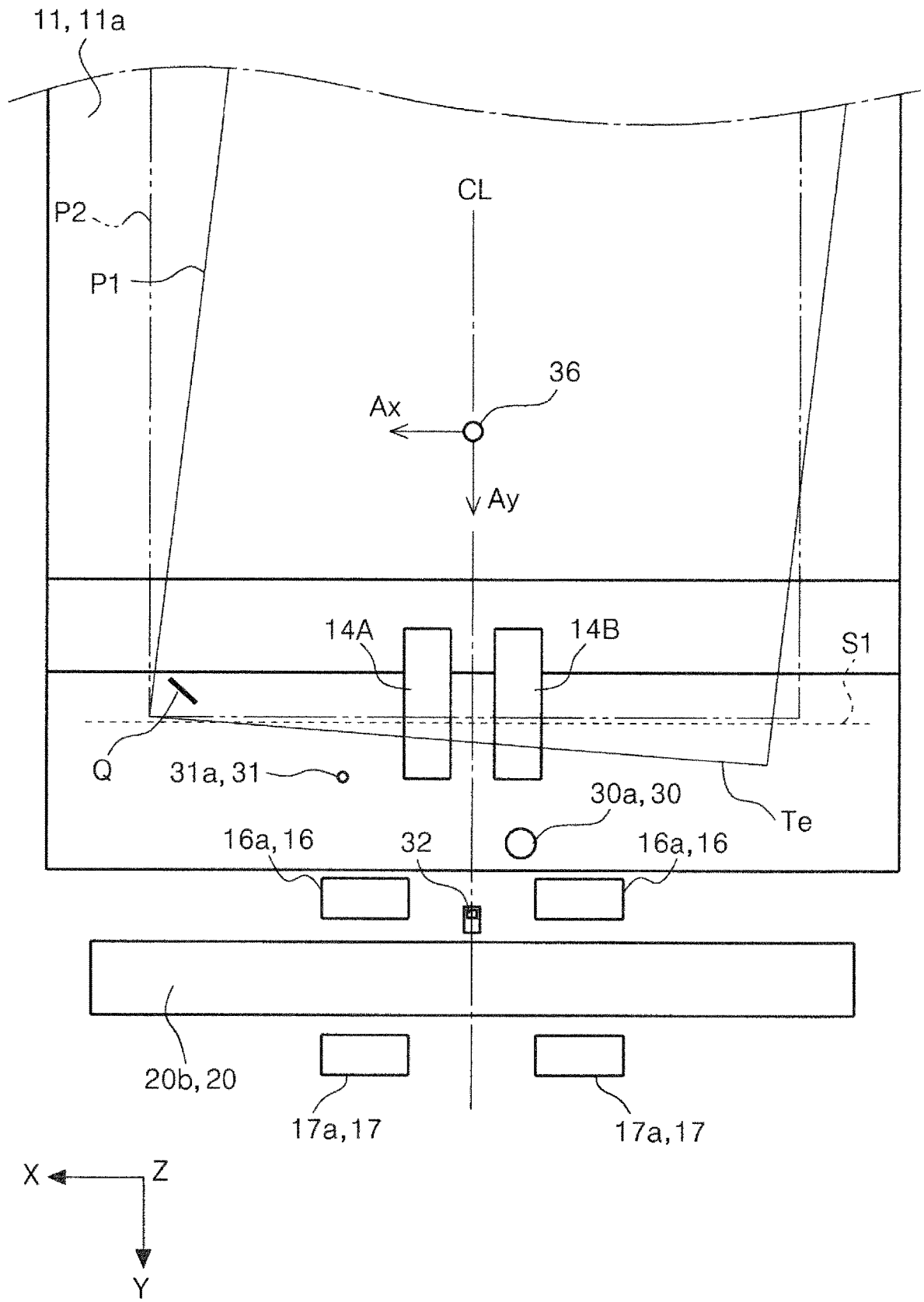
FIG. 3 is a plan view of a document transport path in a scanner.

The feeding roller 14 according to the embodiment is disposed to be symmetric with respect to a center line CL in the document width direction as illustrated in FIG. 3. In FIG. 3, a reference numeral 14A denotes the feeding roller 14 on the left side with respect to the center line CL, and a reference numeral 14B denotes the feeding roller 14 on the right side with respect to the center line CL. Similarly, the separation roller 15 includes a separation roller on the right side and a separation roller on the left side with respect to the center line CL, although not illustrated in FIG. 3. Broken line S1 in FIG. 3 indicates where a document is nipped by the feeding roller 14 and the separation roller 15.

Figure 4:
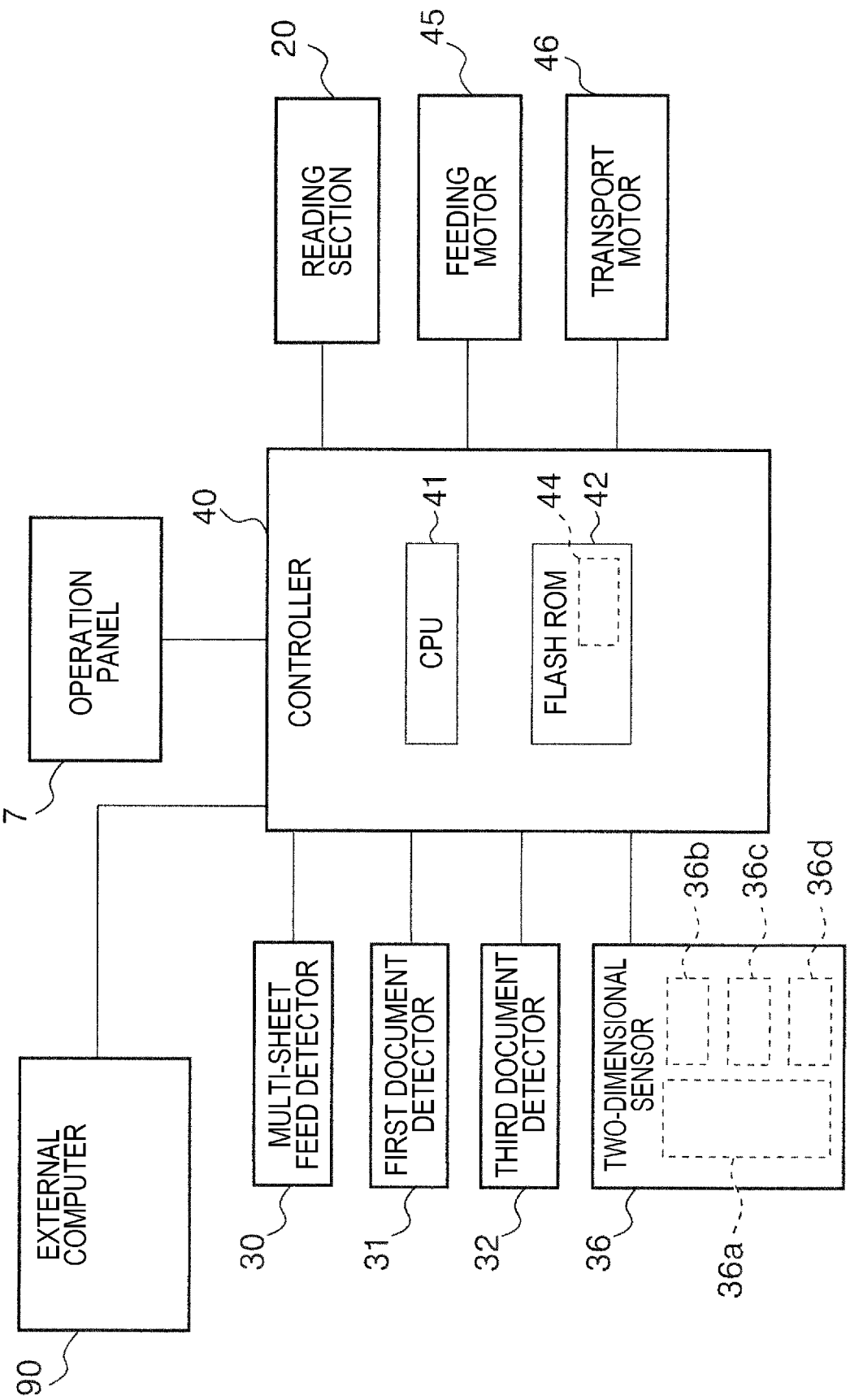
FIG. 4 is a block diagram illustrating a system for controlling a scanner.

The feeding roller 14 is driven and rotated by a feeding motor 45 (see FIG. 4). The feeding roller 14 is rotated counterclockwise in FIG. 2 by rotation torque from the feeding motor 45. A one-way clutch 49 is disposed in a driving force transmission path between the feeding roller 14 and the feeding motor 45 (see FIG. 4). The one-way clutch 49 prevents the feeding roller 14 from rotating in the reverse direction when the feeding motor 45 rotates in the reverse direction. When the feeding motor 45 is in a stopped state, the feeding roller 14 may come into contact with a document P being transported and may be rotated in the counterclockwise direction illustrated in FIG. 2. For example, when a leading edge of a document P is detected by a third document detector 32 disposed downstream of a transport roller pair 16, the controller 40 stops driving of the feeding motor 45 and drives only a transport motor 46. By this operation, the document P is transported by the transport roller pair 16, and the feeding roller 14 comes into contact with the document P being transported and is rotated in the counterclockwise direction illustrated in FIG. 2.

Next, rotation torque is transferred from the transport motor 46 (see FIG. 4) to the separation roller 15 via a torque limiter 50. During the feeding operation of the document P, drive torque for rotating the separation roller 15 in the counterclockwise direction illustrated in FIG. 2 is transferred from the transport motor 46 (see FIG. 4) to the separation roller 15.

When no document P is present or only one sheet of document P is present between the feeding roller 14 and the separation roller 15, the rotation torque that causes the separation roller 15 to rotate in the clockwise direction in FIG. 2 exceeds the torque limit of the torque limiter 50, resulting in slippage in the torque limiter 50. The slippage causes the separation roller 15 to be rotated in the clockwise direction in FIG. 2 irrespective of the rotation torque received from the transport motor 46 (see FIG. 4).

On the other hand, when a second document P and subsequent documents P are fed between the feeding roller 14 and the separation roller 15 in addition to a first document P to be fed, slippage occurs between the documents, and the separation roller 15 subsequently receives the drive torque from the transport motor 46 (see FIG. 4) and rotates in the counterclockwise direction in FIG. 2. This reverse rotation returns the second document P and subsequent documents P being fed together to an upstream location; that is, multi-sheet feeding of the documents P can be prevented.

The transport roller pair 16, the reading section 20 for reading images, and a discharging roller pair 17 are disposed downstream of the feeding roller 14. The transport roller pair 16 includes a transport driving roller 16a that is driven and rotated by the transport motor 46 (see FIG. 4) and a transport driven roller 16b that is driven to rotate. The transport driving roller 16a according to the embodiment consists of two transport driving rollers 16a that are disposed to be symmetric with respect to the center line CL as illustrated in FIG. 3. Similarly, the transport driven rollers 16b are disposed to be symmetric with respect to the center line CL, although not illustrated in FIG. 3. A document P nipped by the feeding roller 14 and the separation roller 15 and fed downstream is nipped by the transport roller pair 16 and transported to the reading section 20 that is disposed downstream of the transport roller pair 16.

The reading section 20 includes an upper read sensor 20a that is provided on the upper unit 4 side and a lower read sensor 20b that is provided on the lower unit 3 side. For example, the upper read sensor 20a and the lower read sensor 20b according to the embodiment are configured as a contact image sensor module (CISM).

After an image on at least one of the front side and the back side of a document P has been read in the reading section 20, the document P is nipped by the discharging roller pair 17 disposed downstream of the reading section 20 and is discharged from the discharge port 18 that is defined on the apparatus front of the lower unit 3. The discharging roller pair 17 includes a discharge driving roller 17a that is driven and rotated by the transport motor 46 (see FIG. 4) and a discharge driving roller 17b that is driven to rotate. The discharge driving roller 17a according to the embodiment consists of two discharge driving rollers 17a that are disposed to be symmetric with respect to the center line CL as illustrated in FIG. 3. Similarly, two discharge driven rollers 17b are disposed to be symmetric with respect to the center line CL, although not illustrated in FIG. 3.

Hereinafter, a control system in the scanner 1 will be described with reference to FIG. 4. FIG. 4 is a block diagram of a control system in the scanner 1 according to the embodiment of the present disclosure. In FIG. 4, the controller 40, which serves as a control unit, controls feeding, transporting, discharging, and reading of a document P and performs various kinds of control of the scanner 1. The controller 40 receives signals input via the operation panel 7.

The controller 40 controls the feeding motor 45 and the transport motor 46. Each of the feeding motor 45 and the transport motor 46 according to the embodiment is a direct current (DC) motor. Read data is input to the controller 40 from the reading section 20, and signals for controlling the reading section 20 are sent from the controller 40 to the reading section 20. The controller 40 also receives signals from the two-dimensional sensor 36, which will be described below, a multi-sheet feed detector 30, a first document detector 31, which serves as a first detector, the third document detector 32, and other detectors, which will be described below. The controller 40 also receives detection values from an encoder for detecting an amount of rotation of the feeding motor 45 and detection values from an encoder for detecting amounts of rotation of the transport driving rollers 16a and the discharge driving rollers 17a, and in accordance with the detection values, the controller 40 detects amounts of document feeding of the individual rollers.

The controller 40 includes a central processing unit (CPU) 41 and a flash read-only memory (ROM) 42. The flash ROM 42 is a readable and writable nonvolatile memory. The CPU 41 performs various kinds of arithmetic processing in accordance with a program 44, parameters, and the like stored in the flash ROM 42 and performs overall operational control of the scanner 1. The program 44 may be a single program or may include a plurality of programs, such as a program for performing abnormal feeding processing, which will be described below, and various control programs necessary for feeding, transporting, and reading of a document P.

The scanner 1 may be coupled to an external computer 90 from which the controller 40 receives information. The external computer 90 includes a display section (not illustrated). A user interface (UI) is implemented on the display section by a control program stored in a storage device (not illustrated) in the external computer 90.

Next, detectors that are disposed in the document transport path T will be described. The two-dimensional sensor 36, which serves as a movement detector, is provided in the document mounting section 11. The two-dimensional sensor 36 faces the lowermost document P of documents P mounted on the document mounting section 11. The two-dimensional sensor 36 is a sensor similar to a sensor used for a computer mouse that is capable of detecting movement of a detection target in a two-dimensional coordinate system, or a sensor based on a similar principle. The two-dimensional sensor 36 includes a controller 36a, a light source 36b, a lens 36c, and an image sensor 36d. The light source 36b is a light source for illuminating a document P mounted on the document mounting section 11 with light via the lens 36c. The light source 36b may be, for example, a red light-emitting diode (LED), an infrared LED, a laser, or a blue LED, and in this embodiment, laser light is employed. The light source 36b may be switched between a light emission state and non-light emission state under the control of the controller 40. The lens 36c guides the light emitted from the light source

36b to a document P mounted on the document mounting section 11 to illuminate the document P with the light.

The image sensor 36d is a sensor that receives light reflected from a document P mounted on the document mounting section 11 and may be an image sensor such as a complementary metal-oxide semiconductor (CMOS) sensor or a charge coupled device (CCD) sensor. The image sensor 36d has pixels arranged in a first axis Ay direction and in a second axis Ax direction orthogonal to the first axis Ay direction. FIG. 3 illustrates the first axis Ay direction and the second axis Ax direction. In this embodiment, the first axis Ay direction is parallel to the Y-axis direction and the second axis Ax direction is parallel to the X-axis direction. The first axis Ay direction is an example first direction, and the second axis Ax direction is an example second direction. In this specification, it is to be understood that the "first axis Ay direction" denotes corresponding to the pressure chamber C1 both a positive Ay direction and a negative Ay direction. Similarly, the "second axis Ax direction" denotes both a positive Ax direction and a negative Ax direction.

The controller 36a analyzes an image captured by the image sensor 36d and outputs an amount of movement Wy of the image in the first axis Ay direction and an amount of movement Wx of the image in the second axis Ax direction as detection values. The image analysis method for the controller 36aA may be a known method applied to a computer mouse.

The controller 40 acquires the amounts of movement Wy and Wx from the two-dimensional sensor 36 and uses the acquired the amounts of movement Wy and Wx to determine the movement of a document P that is being fed. The two-dimensional sensor 36 according to the embodiment outputs the amounts of movement Wy and Wx to the controller 40 and the output values are reset to zero in accordance with an initialization instruction from the controller 40. The controller 40 acquires a moving velocity Vy of the document P in the first axis Ay direction in accordance with the acquired the amount of movement Wy and acquires a moving velocity Vx of the document P in the second axis Ax direction in accordance with the acquired the amount of movement Wx. The moving velocity Vy is an example first value that indicates movement of a document P in the first axis Ay direction, and the moving velocity Vx is an example second value that indicates movement of a document P in the second axis Ax direction.

It is to be understood that although the example two-dimensional sensor 36 is the optical sensor, the two-dimensional sensor 36 may be a mechanical sensor, more specifically, a sensor having a trackball, a rotary encoder for detecting the rotation of the trackball in the first axis Ay direction, and a rotary encoder for detecting the rotation of the trackball in the second axis Ax direction. However, the optical two-dimensional sensor 36 can detect movement of documents P more precisely. In this embodiment, a single two-dimensional sensor 36 is used to acquire a detection value in the first axis Ay direction and a detection value in the second axis Ax direction; alternatively, a sensor for acquiring a detection value in the first axis Ay direction and a sensor for acquiring a detection value in the second axis Ax direction may be provided as separate sensors.

The first document detector 31 is disposed near and downstream of the feeding roller 14. The first document detector 31 is, for example, an optical sensor that includes a light emitter 31a and a light receiver 31b that face each other across the document feeding path T as illustrated in FIG. 2. The light receiver 31b sends an electrical signal indicating the intensity of detection light to the controller 40. A document P being transported interrupts the detection light emitted from the light emitter 31a and the electrical signal indicating the intensity of the detection light changes, and thereby the controller 40 detects the passage of a leading edge or a trailing edge of the document P. The document detection position of the first document detector 31 may be set at a position 4 to 20 mm downstream of the document nip position of the feeding roller 14 and the separation roller 15.

The multi-sheet feed detector 30 that detects multi-sheet feeding of documents P is disposed downstream of the first document detector 31. The multi-sheet feed detector 30 includes an ultrasonic transmitter 30a and an ultrasonic receiver 30b for receiving ultrasonic waves, and the ultrasonic transmitter 30a and the ultrasonic receiver 30b face each other across the document feeding path T as illustrated in FIG. 2. The multi-sheet feed detector 30 sends output values corresponding to the intensity of ultrasonic waves detected by the ultrasonic receiver 30b to the controller 40. When multi-sheet feeding of documents P occurs, electrical signals indicating the intensity of the ultrasonic waves change, and thereby the controller 40 detects the multi-sheet feeding of the documents P.

The third document detector 32 is disposed downstream of the multi-sheet feed detector 30 and also downstream of the transport roller pair 16. The third document detector 32 is a contact sensor that has a lever. In response to the passage of a leading edge or a trailing edge of a document P, the lever rotates and the electrical signals sent from the third document detector 32 to the controller 40 change, and thereby the controller 40 detects the passage of the leading edge or the trailing edge of the document P. The controller 40 determines the location of a document P in the document feeding path T by using the above-described first document detector 31 and the third document detector 32.

Next, processing of abnormal feeding using the two-dimensional sensor 36 is described. The controller 40 determines abnormal feeding in accordance with values detected by the two-dimensional sensor 36, and when a predetermined condition is satisfied, the controller 40 determines that abnormal feeding has occurred and stops transporting the document P. Specifically in this embodiment, the feeding motor 45 and the transport motor 46 are stopped. The two-dimensional sensor 36 has the image sensor 36d having pixels arranged in the first axis Ay direction and the second axis Ax direction, which is orthogonal to the first axis Ay direction, as described above. The two-dimensional sensor 36 is disposed such that the first axis Ay direction is parallel to the Y-axis direction and the second axis Ax direction is parallel to the X-axis direction.

Examples of abnormal feeding include an abnormal condition due to stapled sheets of documents P that are mounted on the document mounting section 11 and fed. A document P1 in FIG. 3 is the lowermost document of document sheets mounted on the document mounting section 11. A document P2 indicated by the chain double-dashed line is a document on top of the document P1. The document P2 and the document P1 are stapled together using a staple Q at a top end portion in the positive X direction. When the feeding roller 14 is rotated in this state, the document P1 is fed downstream while the document P2 is held in place by the action of the separation roller 15, and thereby the fed document P1 is advanced downstream while being rotated with respect to the position of the staple Q or with respect to the region as illustrated in FIG. 3. X-direction components of the document P1 in the moving direction due to the rotation of the document P1 are reflected by the velocity in the second axis Ax direction detected by the two-dimensional sensor 36.

The controller 40 determines abnormal feeding in accordance with the moving velocity Vx of the document P in the second axis Ax direction, and when the controller 40 determines abnormal feeding, the controller 40 stops feeding and transporting the document P, more specifically, by stopping the feeding motor 45 (see FIG. 4) and the transport motor 46 (see FIG. 4).

Figure 5:
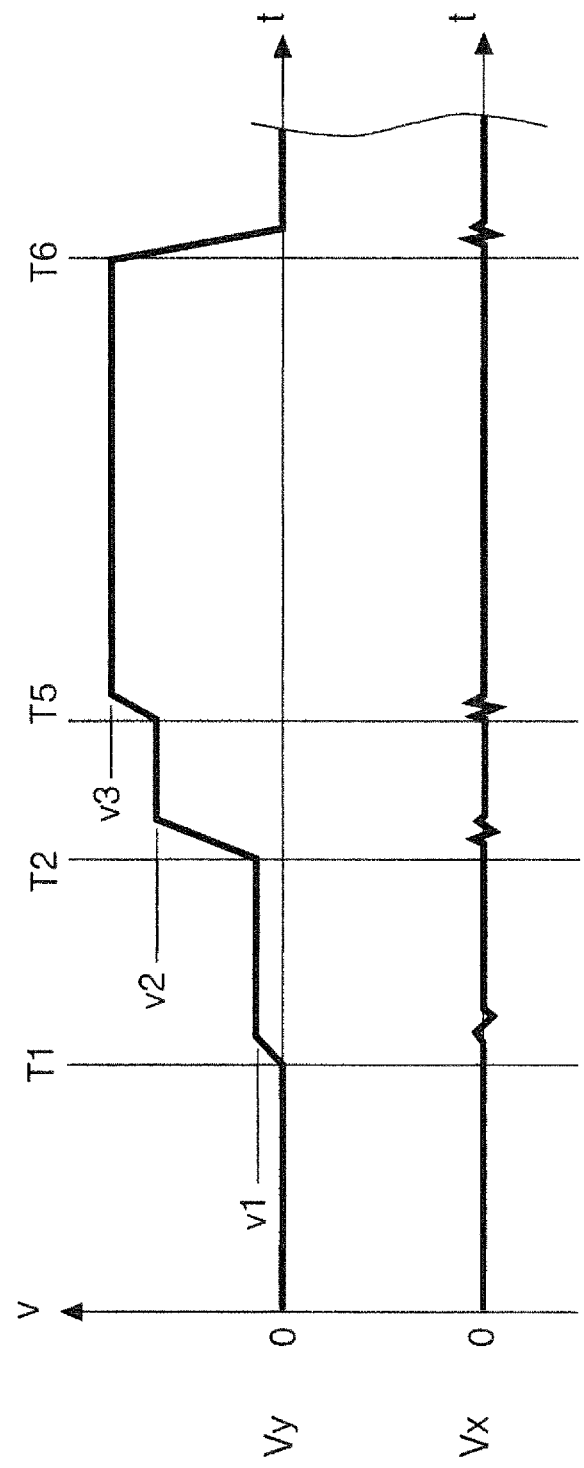
FIG. 5 illustrates example moving velocities Vy and Vx in a condition in which a document is transported normally.

Hereinafter, this operation will be further described in detail. FIG. 5 illustrates examples of moving velocities Vy and Vx when a document P is fed normally. First, control processes for feeding a document P will be described with reference to FIG. 5. The moving velocity Vy in FIG. 5 is a moving velocity in the Y-axis direction when the document P is fed normally and corresponds to a target velocity for feeding the document P.

The controller 40 receives an instruction to start document feeding and causes the feeding motor 45 to rotate (timing T1). By this operation, the moving velocity Vy is increased from zero to a velocity V1. After the controller 40 detects a leading edge Te (see FIG. 3) of the document P by using the first document detector 31, the controller 40 causes the feeding motor 45 to increase the rotation speed (timing T2). By this operation, the moving velocity Vy reaches a velocity V2. As the document P is advanced, the leading edge Te is nipped by the rotating transport roller pair 16 (timing T5). By this operation, the moving velocity Vy reaches a velocity V3. The document P is advanced while being read and a trailing edge of the document passes the position of the two-dimensional sensor 36 (timing T6), and the moving velocity Vy becomes zero.

Figure 6:
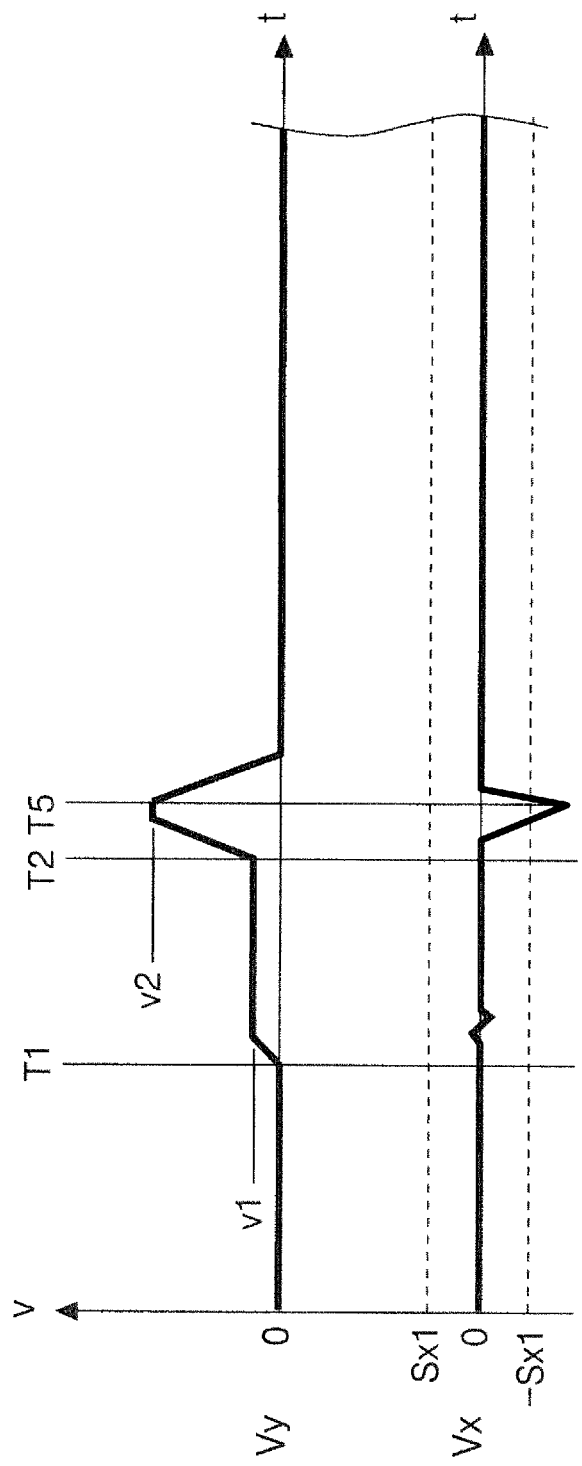
FIG. 6 illustrates example moving velocities Vy and Vx in a condition in which a document is transported while being rotated.

Different from the above-described normal feeding illustrated in FIG. 5, when rotation of the document P such as the rotation described with reference to FIG. 3 occurs, the moving velocity Vx changes as illustrated in FIG. 6. Accordingly, abnormal feeding can be detected by monitoring the moving velocity Vx. In FIG. 6, the value Sx1 and the value −Sx1 are thresholds of the moving velocity Vx. When the moving velocity Vx falls outside this range, from the value Sx1 to the value −Sx1, the controller 40 determines that abnormal feeding has occurred and stops feeding and transporting the document P. In the example in FIG. 6, the moving velocity Vx falls below the value −Sx1 at timing T5 and the controller 40 thus stops feeding and transporting the document P.

Figure 7:
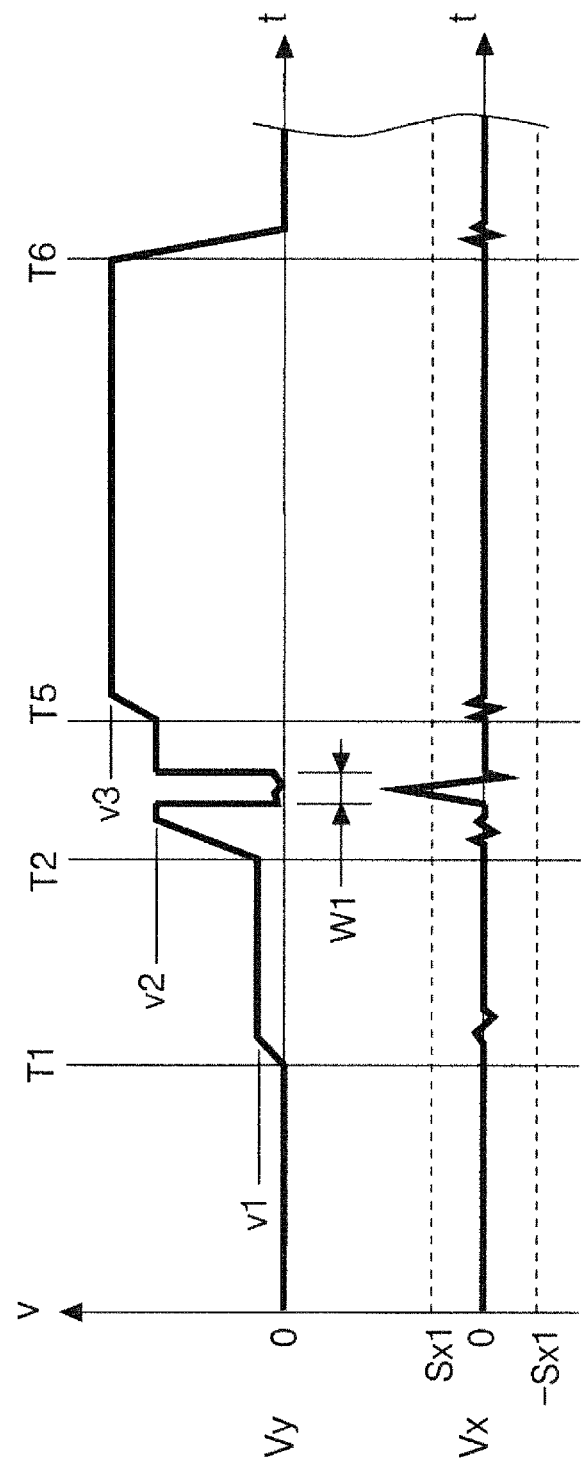
FIG. 7 illustrates example moving velocities Vy and Vx in a condition in which operation of transporting a document temporarily fluctuates.

FIG. 7 illustrates example moving velocities Vy and Vx under a condition in which operation of transporting a document P temporarily fluctuates. In FIG. 7, the moving velocities Vy and Vx temporarily fluctuate in the period of the velocity V2 (period W1). This fluctuation is due to detection by the two-dimensional sensor 36, but the document P is actually being fed appropriately. However, if nothing is performed for such a condition illustrated in FIG. 7, the controller 40 determines that abnormal feeding has occurred in accordance with the moving velocity Vx rising above the value Sx1 and stops feeding and transporting the document P.

Figure 9:
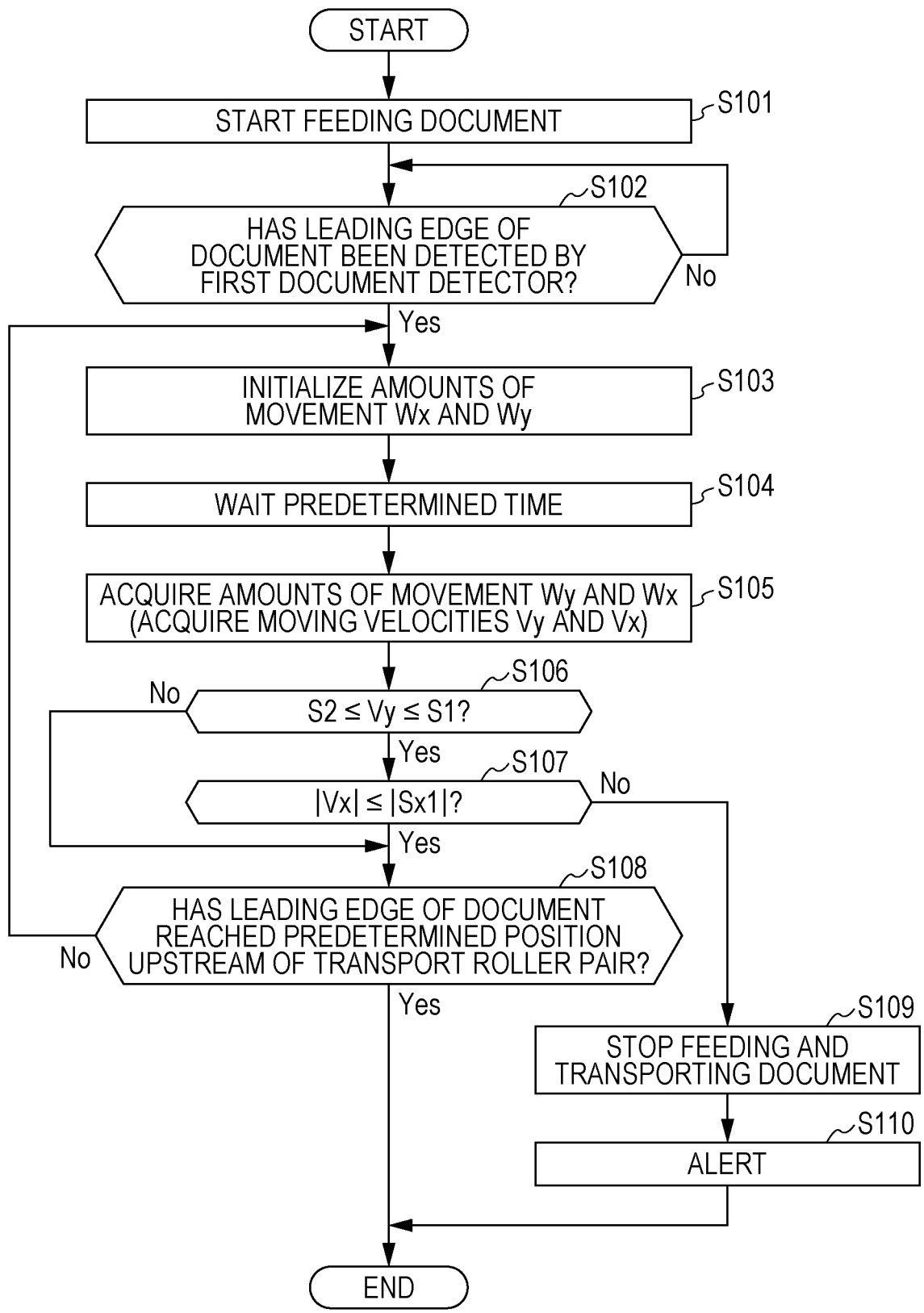
FIG. 9 is a flowchart illustrating a flow of processing for abnormal feeding.

To solve this problem, the controller 40 performs abnormal feeding processing described below. In FIG. 9, after the controller 40 starts feeding of a document P (step S101) and detects a leading edge Te of the document P by using the first document detector 31 (Yes in step S102), the controller 40 repeats processes in step S103 to step S107, which will be described below, until the leading edge Te of the document P reaches a predetermined position upstream of the transport roller pair 16 (Yes in step S108). The predetermined position may be a position, for example, 4 to 20 mm upstream of the document nip position of the transport roller pair 16, the reason for which is described later.

The processes in step S103 to S107 are examples of the abnormal feeding processing, and the period from the passage of the leading edge Te of the document P past the first document detector 31 to the arrival of the leading edge Te of the document P at the predetermined position upstream of the transport roller pair 16 is an example of a first period. In this embodiment, the abnormal feeding processing is performed in the first period. Timings T2 to T5 in FIG. 8 constitute an example of the first period.

In step S103, the controller 40 initializes the amounts of movement Wy and Wx of the two-dimensional sensor 36 (step S103). The controller 40 then waits a predetermined time (step S104) and acquires amounts of movement Wy and Wx (step S105). Each time the controller 40 waits the predetermined time (step S104), that is, each time the controller 40 acquires amounts of movement Wy and Wx, the controller 40 initializes the amounts of movement Wy and Wx, and thus the amounts of movement Wy and Wx acquired in step S105 correspond to moving velocities Vy and Vx per predetermined wait time. The predetermined time in step S104 may be set to an appropriate time, for example, 10 ms.

Figure 8:
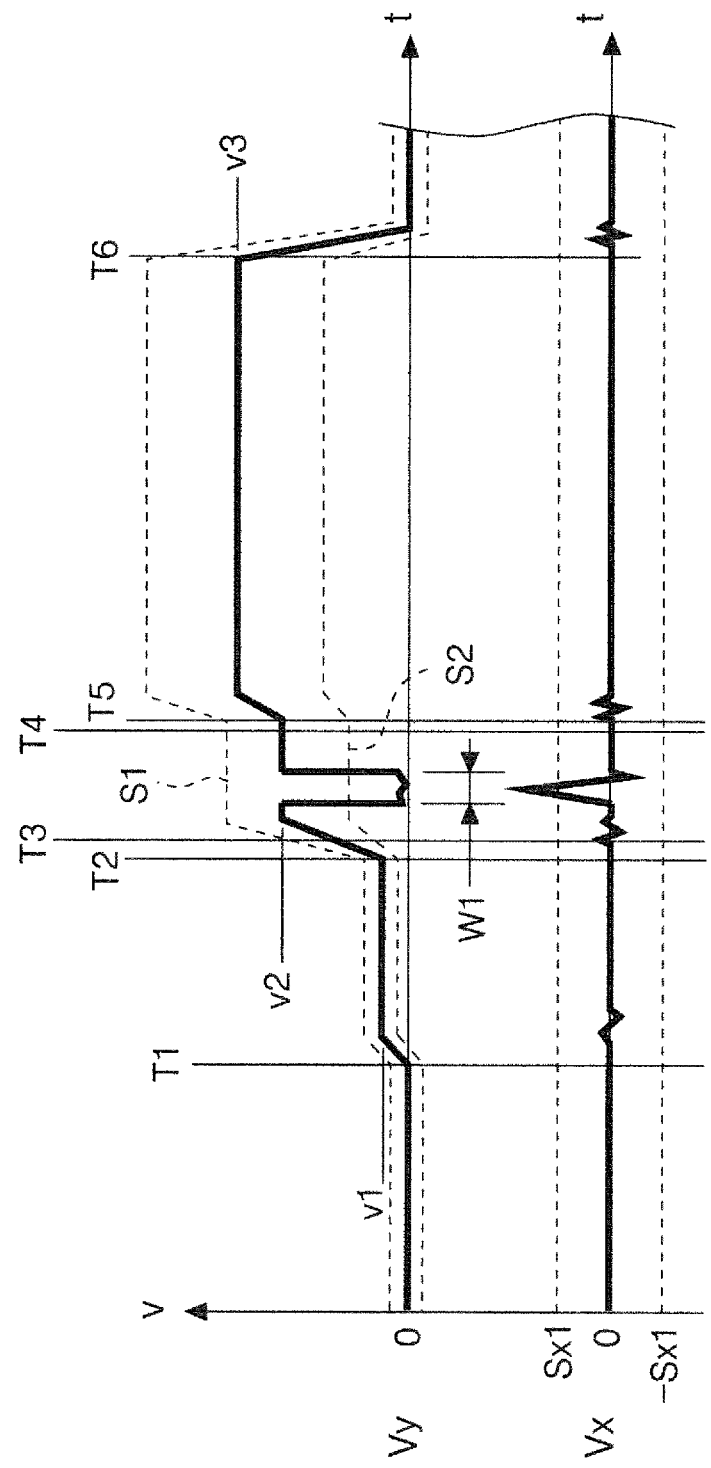
FIG. 8 illustrates example moving velocities Vy and Vx in a condition in which operation of transporting a document temporarily fluctuates.

The controller 40 then determines whether the moving velocity Vy is within an allowable range (step S106). The allowable range is between an upper limit S1 and a lower limit S2 as illustrated in FIG. 8. In FIG. 8, the upper limit S1 and the lower limit S2 are set to all periods for the sake of convenience; however, the upper limit S1 and the lower limit S2 may be set to only the first period for performing the abnormal feeding processing. In this embodiment, the upper limit S1 is obtained by adding a percentage of a target velocity for feeding the document P to the target feeding velocity, and the lower limit S2 is obtained by subtracting the percentage of the target velocity for feeding the document P from the target feeding velocity. Such a process for setting the allowable range enables an allowable range appropriately set depending on a target velocity for feeding the document P to be provided. It should be noted that the percentage may be set appropriately, and in this embodiment, a percentage of 50% of the target velocity for feeding the document P is set. The upper limit S1 may be obtained by multiplying the target velocity for feeding the document P by a factor greater than or equal to one. The lower limit S2 may be obtained by multiplying the target velocity for feeding the document P by a factor less than one. Alternatively, the upper limit S1 may be obtained by adding a fixed value to the target velocity for feeding the document P, and the lower limit S2 may be obtained by subtracting a fixed value from the target velocity for feeding the document P. Alternatively, the upper limit S1 and the lower limit S2 may be predetermined values that are set for each range of a target velocity for feeding the document P.

When the target feeding velocity is low, the difference between the upper limit S1 and the target feeding velocity obtained by the above-described method and the difference between the lower limit S2 and the target feeding velocity may be too small, and accordingly the determination (step S107 in FIG. 9) of a moving velocity Vx, which will be described below, is frequently skipped. Accordingly, respective minimum values may be set to the difference between the target velocity for feeding the document P and the upper limit S1 and the difference between the target feeding velocity and the lower limit S2. When the target feeding velocity is zero, the minimum values may be used, or a predetermined upper limit S1 and a predetermined lower limit S2 may be used.

In this embodiment, the target velocity for feeding the document P is stored in the flash ROM 42 in the controller 40 as control information for the feeding motor 45 (see FIG. 4), and the upper limit S1 and the lower limit S2 are also stored in the flash ROM 42. Alternatively, the upper limit S1 and the lower limit S2 may be calculated each time in accordance with the target velocity for feeding the document P. Instead of calculating the upper limit S1 and the lower limit S2 in accordance with the target velocity for feeding the document P, the upper limit S1 and the lower limit S2 may be calculated by detecting an amount of rotation of the rotation shaft of the feeding motor 45 and/or an amount of rotation of the rotation shaft of the feeding roller 14 and using one or both of these detection amounts. The amount of rotation of the rotation shaft of the feeding motor 45 and the amount of rotation of the rotation shaft of the feeding roller 14 may be detected by using rotary encoders.

When the moving velocity Vy is within the allowable range (Yes in step S106), the controller 40 determines whether the absolute value of the acquired moving velocity Vx is less than or equal to the absolute value of the threshold Sx1 (step S107). As a result of the determination, when the absolute value of the moving velocity Vx exceeds the absolute value of the threshold Sx1 (No in step S107), the controller 40 determines that abnormal feeding has occurred, stops feeding and transporting the document P (step S109), and alerts the user of the occurrence of the abnormal feeding (step S110). When the absolute value of the moving velocity Vx is less than or equal to the absolute value of the threshold Sx1 (Yes in step S107), the processing proceeds to step S108.

In step S106, when the moving velocity Vy is outside the allowable range (No in step S106), the controller 40 determines that temporary transport fluctuations have occurred and skips the determination (step S107) of the moving velocity Vx, and the processing proceeds to step S108. In this embodiment, the amounts of movement Wx and Wy, that is, the moving velocities Vy and Vx, are acquired in step S105. However, the amount of movement Wx and the moving velocity Vx may be acquired only when the moving velocity Vy is within the allowable range, and acquisition of the amount of movement Wx and the moving velocity Vx may be skipped when the moving velocity Vy is outside the allowable range.

As described above, the controller 40 that controls feeding of a document P in accordance with the information acquired from the two-dimensional sensor 36 is capable of performing the abnormal feeding processing depending on the movement of the document P in the second axis Ax direction. The abnormal feeding processing includes stopping feeding of a document P when a moving velocity Vx that indicates the movement of the document P in the second axis Ax direction exceeds a threshold when a moving velocity Vy that indicates the movement of the document P in the first axis Ay direction is within an allowable range, and includes continuing feeding of the document P regardless of the moving velocity Vx or without acquiring the moving velocity Vx when the moving velocity Vy is outside the allowable range. The scanner 1 performs such a document feeding method, thereby suppressing erroneous detection of abnormal feeding due to temporary transport fluctuations of a document P.

In addition, the controller 40 performs the abnormal feeding processing in the first period from passage of the leading edge Te of a document P past the feeding roller 14 to arrival of the leading edge of the document P at the transport roller pair 16 and does not perform the abnormal feeding processing in the period, other than the first period, from the start of feeding of the document P to arrival of the leading edge of the document P at the transport roller pair 16. The timings T1 to T5 in FIG. 8 correspond to the period from the start of feeding a document P to arrival of the leading edge of the document P at the transport roller pair 16. The timings T2 to T5 in FIG. 8 are an example of the first period from passage of the leading edge Te of a document P past the feeding roller 14 to arrival of the leading edge of the document P at the transport roller pair 16.

When the leading edge of a document P passes the nip position of the feeding roller 14 and the separation roller 15, temporary transport fluctuations tend to occur. In view of such characteristics, the controller 40 performs the abnormal feeding processing in the first period and does not perform the abnormal feeding processing in the period, other than the first period, from the start of feeding of the document P to the arrival of the leading edge of the document P at the transport roller pair 16. This processing suppresses erroneous detection of abnormal feeding due to temporary transport fluctuations.

In addition, immediately after the feeding velocity of the document P is switched from a velocity in a constant velocity period to a velocity in an acceleration period and immediately after the feeding velocity is switched from the velocity in the constant velocity period to a velocity in a deceleration period, temporary transport fluctuations tend to occur. Accordingly, the start of the first period in which the abnormal feeding processing is performed may be set to the timing T3, which is immediately after the timing T2 in FIG. 8. In addition, at a timing at which the leading edge Te of a document P is nipped by the roller pair, temporary transport fluctuations tend to occur. Accordingly, the end of the first period in which the abnormal feeding processing is performed may be set to the timing T4, which is just before the timing T5 in FIG. 8. At the timing T4, the leading edge Te of the document P reaches a predetermined position upstream of the transport roller pair 16 (step S108 in FIG. 9).

In the above-described embodiment, the first period is set to the period from the passage of the leading edge Te of the document P past the feeding roller 14 to the arrival of the leading edge of the document P at the transport roller pair 16; however, the first period is not limited to this period, and the first period may be set to another period or to all of the periods illustrated in FIG. 8.

In addition, the controller 40 sets the first period to the period from the passage of the leading edge Te of the document P detected by using the first document detector 31 to the time the document P is transported by a predetermined amount, and thus the end of the first period is readily set without using a component such as a sensor.

Figure 10:
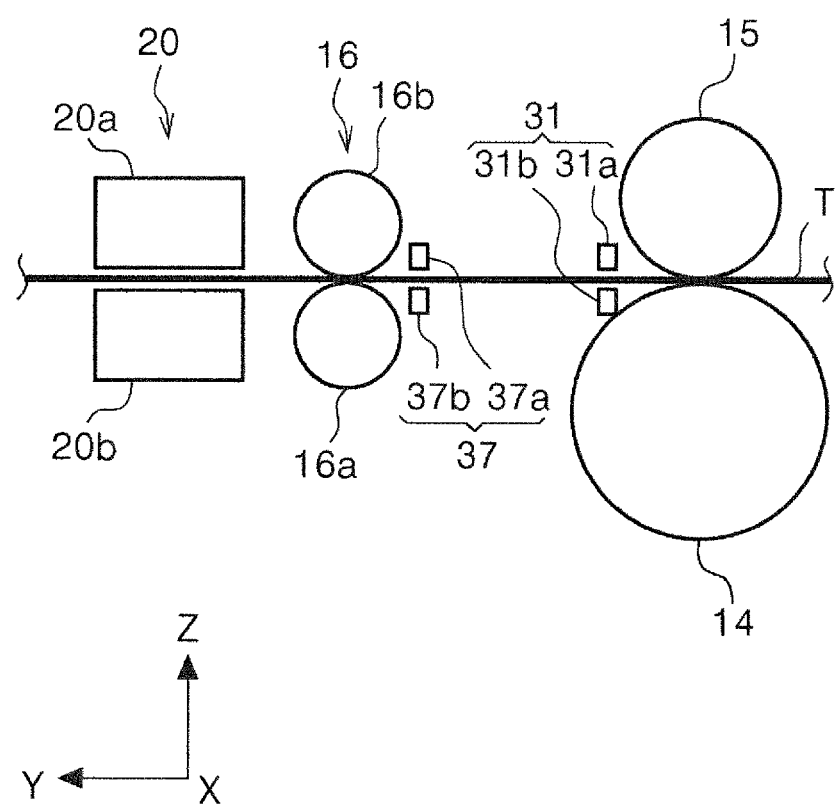
FIG. 10 illustrates a second document detector disposed upstream of a transport roller pair.

In addition, as in another embodiment illustrated in FIG. 10, a second document detector 37 that serves as a second detector for detecting the passage of a leading edge of a document P may be disposed downstream of the first document detector 31 and upstream of the transport roller pair 16 in the document feeding direction. The second document detector 37 includes a light emitter 37a and a light receiver 37b that face each other across the document feeding path T. In such a case, the controller 40 may set the first period to a period from the passage of the leading edge Te of the document P detected by using the first document detector 31 to the passage of the leading edge Te of the document P detected by using the second document detector 37. By this setting, the start and end of the first period is set accurately.

In the above-described embodiment, the timings T2 to T4 constitute the first period in which the abnormal feeding processing is performed as described with reference to FIG. 8 as an example, and the timings T2 to T4 include the acceleration period in which the moving velocity Vy is increased from a velocity V1 to a velocity V2. The first period in which the abnormal feeding processing is performed may be the constant velocity period that includes neither the acceleration period nor the deceleration period.

It is to be understood that the present disclosure is not limited to the above-described embodiments, that various modifications may be made within the scope of the following claims, and that these modifications are included within the scope of the disclosure.

What is claimed is:

1. A medium-feeding apparatus comprising:
   a medium mounting section on which a medium is to be mounted;
   a feeding roller configured to feed the medium mounted on the medium mounting section in a feeding direction;
   a movement detector disposed upstream of the feeding roller in the feeding direction, the movement detector being configured to output information on movement of the medium in a first direction parallel to the feeding direction and in a second direction intersecting the feeding direction;
   a transport roller pair disposed downstream of the feeding roller in the feeding direction, the transport roller pair being configured to transport the medium downstream; and
   a control unit configured to control feeding of the medium in accordance with the information acquired from the movement detector, wherein
   the control unit is configured to perform abnormal feeding processing depending on the movement of the medium in the second direction, wherein
   in the abnormal feeding processing, the control unit stops feeding of the medium when a first value indicating the movement of the medium in the first direction is within an allowable range and a second value indicating the movement of the medium in the second direction exceeds a threshold,
   continues feeding of the medium when the first value is outside the allowable range,
   the control unit performs the abnormal feeding processing in a first period from passage of a leading edge of the medium past the feeding roller to arrival of the leading edge at the transport roller pair, and
   does not perform the abnormal feeding processing in a period, other than the first period, from the start of feeding of the medium to the arrival of the leading edge at the transport roller pair.

2. The medium-feeding apparatus according to claim 1, further comprising:
   a first detector disposed downstream of the feeding roller in the feeding direction, the first detector being configured to detect the passage of the leading edge of the medium, wherein
   the control unit sets the first period to a period from the passage of the leading edge of the medium detected by using the first detector to a time the document is transported by a predetermined amount.

3. The medium-feeding apparatus according to claim 1, further comprising:
   a first detector disposed downstream of the feeding roller in the feeding direction, the first detector being configured to detect the passage of the leading edge of the medium; and
   a second detector disposed downstream of the first detector in the feeding direction, the second detector being configured to detect the passage of the leading edge of the media, wherein
   the control unit sets the first period to a period from the passage of the leading edge of the medium detected by using the first detector to the passage of the leading edge of the medium detected by using the second detector.

4. The medium-feeding apparatus according to claim 1, wherein the control unit performs the abnormal feeding processing when a medium-feeding velocity is constant.

5. The medium-feeding apparatus according to claim 1, wherein the feeding roller comes into contact with a bottom surface of the medium mounted on the medium mounting section, and
   the movement detector is disposed at a position facing the bottom surface of the medium mounted on the medium mounting section.

6. An image reading apparatus comprising:
   a reader configured to read the medium; and
   the medium-feeding apparatus according to claim 1 configured to feed the medium to the reader.

7. A medium-feeding apparatus comprising:
   a medium mounting section on which a medium is to be mounted;
   a feeding roller configured to feed the medium mounted on the medium mounting section in a feeding direction;
   a movement detector disposed upstream of the feeding roller in the feeding direction, the movement detector being configured to output information on movement of the medium in a first direction parallel to the feeding direction and in a second direction intersecting the feeding direction; and
   a control unit configured to control feeding of the medium in accordance with the information acquired from the movement detector, wherein
   the control unit is configured to perform abnormal feeding processing depending on the movement of the medium in the second direction, wherein
   in the abnormal feeding processing, the control unit stops feeding of the medium when a first value indicating the movement of the medium in the first direction is within an allowable range and a second value indicating the movement of the medium in the second direction exceeds a threshold, and
   continues feeding of the medium when the first value is outside the allowable range,
   wherein the allowable range is a range from an upper limit obtained by adding a percentage of a target medium-feeding velocity to the target medium-feeding velocity to a lower limit obtained by subtracting the percentage from the target feeding velocity or is a range from an upper limit obtained by multiplying the target medium-feeding velocity by a factor greater than or equal to one and a lower limit obtained by multiplying the target medium-feeding velocity by a factor less than one.

8. A medium-feeding method for a medium-feeding apparatus including a medium mounting section on which a medium is to be mounted;
   a feeding roller configured to feed the medium mounted on the medium mounting section in a feeding direction; and a movement detector disposed upstream of the feeding roller in the feeding direction, the movement detector being configured to output information on movement of the medium in a first direction parallel to the feeding direction and in a second direction intersecting the feeding direction, the medium-feeding method comprising:

stopping feeding of the medium when a first value indicating the movement of the medium in the first direction is within an allowable range and a second value indicating the movement of the medium in the second direction exceeds a threshold; and continuing feeding of the medium when the first value is outside the allowable range, wherein the allowable range is a range from an upper limit obtained by adding a percentage of a target medium-feeding velocity to the target medium-feeding velocity to a lower limit obtained by subtracting the percentage from the target feeding velocity or is a range from an upper limit obtained by multiplying the target medium-feeding velocity by a factor greater than or equal to one and a lower limit obtained by multiplying the target medium-feeding velocity by a factor less than one.

* * * * *